United States Patent [19]

Ashbrook et al.

[11] Patent Number: 4,722,799
[45] Date of Patent: Feb. 2, 1988

[54] NATURAL GAS DESULPHURIZING APPARATUS AND METHOD

[76] Inventors: Clifford L. Ashbrook, Route 2, Box 439, Spicewood, Tex. 78669; Douglas B. Scarborough, Route 17, Box 124-A3, San Antonio, Tex. 78238

[21] Appl. No.: 776,830

[22] Filed: Sep. 17, 1985

Related U.S. Application Data

[63] Continuation-in-part of Ser. No. 726,429, Apr. 24, 1985, Pat. No. 4,645,606.

[51] Int. Cl.⁴ .................. B01D 19/00; B01D 21/00; C02F 1/72; C02F 1/78
[52] U.S. Cl. ........................... 210/722; 55/228; 210/188; 210/195.1; 210/257.1; 210/750; 210/758; 210/760; 210/800; 210/805; 422/107; 423/224; 423/225; 423/231; 423/242; 423/573 R

[58] Field of Search ............ 422/170; 55/228; 423/224, 225, 231, 242, 573 R, 573 G; 210/86, 104, 188, 194, 195.1, 257.1, 695, 744, 750, 758, 760, 800, 805, 807, 721, 722

[56] References Cited

U.S. PATENT DOCUMENTS

| | | | |
|---|---|---|---|
| 4,001,385 | 1/1977 | Sanders | 423/573 G |
| 4,036,942 | 7/1977 | Sibeud et al. | 423/573 R |
| 4,261,521 | 4/1981 | Ashbrook | 241/39 X |
| 4,278,646 | 7/1981 | Lynn et al. | 423/573 G |

Primary Examiner—Richard V. Fisher
Assistant Examiner—W. Gary Jones
Attorney, Agent, or Firm—Cox & Smith Inc.

[57] ABSTRACT

A desulphurization apparatus and method for natural gas in which red iron oxide is reacted with the sulphur compounds found in natural gas to remove these compounds from the gas. The treating solution is then recycled to regenerate the red iron oxide solution with elemental sulphur formed as a byproduct for removal.

16 Claims, 3 Drawing Figures

NATURAL GAS DESULPHURIZING APPARATUS AND METHOD

This is a continuation-in-part of pending application, Ser. No. 726,429, filed Apr. 24, 1985, now U.S. Pat. No. 4,645,606, which is incorporated by reference herein, in toto, for all purposes.

BACKGROUND OF THE INVENTION

The present invention relates to an apparatus and method for treating gases. More particularly, the present invention relates to an apparatus and method for desulphurizing natural gas where the process is capable of running relatively continuously, safely and economically, with low maintenance required.

Gases, particularly natural gas, often contain unwanted sulphuric gaseous compounds, such as $H_2S$. It is desirable to remove these sulphuric gases before substantial transmission of the natural gas has taken place, because the sulphuric gases are highly corrosive or react to form corrosive substances, such as sulfuric acid. Further, the smell of many of the sulphuric gases is unpleasant, and can be a health hazard to those exposed to it. On the other hand, while it is desired to remove sulphuric gases from natural gas, the relatively small amount of sulphuric gases found by percentage in natural gas requires that the extraction be economical.

A method of desulphurizing natural gas known in the art involves treating the natural gas chemically with ferric oxide, $Fe_2O_3$, otherwise known as red iron oxide. The ferric oxide is reacted with the sulphuric gaseous compound in a manner which removes the sulphur from the gas and changes the $Fe_2O_3$ to ferrous oxide, $Fe_3O_4$, otherwise known as black iron oxide.

This black iron oxide, $Fe_3O_4$, must be changed back to red iron oxide, $Fe_2O_3$, so that the process may continue. It is at this point that methods used in the prior art have encountered difficulty.

One of the aspects of making the desulphurization process economical is the minimizing of the labor required to run and maintain the process. Also, since most natural gas wells flow relatively steady, it is desired to obtain a process which runs relatively constantly, so that the well does not have to be shut in while the process is being repaired or maintained. In the prior art, red iron oxide has been used in the desulphurization process by contacting wood shavings treated in a red iron oxide solution. The wood shavings are mixed in the solution, allowed to dry and then inserted into the process for purposes of reacting with the sulfurous compounds. However, after going through the process, the treated wood chips must be replaced or retreated, to turn the black iron oxide back to red iron oxide. Normally the black iron oxide in the wood chips is changed back to red iron oxide by removing the chips from the process and spreading them on the ground for a length of time sufficient to allow them to "rust" back to red iron oxide. This operation is labor intensive, because the chips must be removed and spread on the ground, and is also costly in terms of lost production because the well must be shut in.

Another method used in the prior art for desulphurizing natural gas involves the use of arsenic in the process. However, this process cannot be kept as a completely closed system, so that arsenic ponds must be maintained around the well sites. These ponds pose significant health hazards.

The present invention overcomes these inadequacies in the prior art by providing a desulphurization apparatus and method which runs relatively continuously, safely, economically and with low maintenance.

Therefore, it is an object of the present invention to provide a desulphurization apparatus and method for natural gas which runs relatively continuously, safely, economically and with low maintenance.

It is a further object of the present invention that the apparatus and method effectively remove sulphuric gases from natural gas.

Other objects of the present invention, although not mentioned above, will become obvious during the following description of the preferred embodiment, and they are intended to fall within the objects of the present invention.

SUMMARY OF THE INVENTION

An apparatus and method for continuously desulphurizing natural gas and regenerating a reaction solution. The apparatus may be comprised of a contacting means, which is in turn comprised of a substantially closed tower and a solution removal means for contacting natural gas with a reaction solution so as to substantially oxidize sulphurous compounds in the gas. The apparatus is further comprised of a treating means for continuously regenerating the reaction solution including a collector tank and means operably connected to the collector tank and a recycling means for circulating the solution through the contacting means and the treating means, the recycling means for reducing sulphurous compounds in the solution so as to precipitate sulphur from the solution and allow for removal of the precipitated sulphur from the solution. The method may be comprised of the steps of reacting natural gas in a substantially closed tower by contacting the gas with a metallic oxide solution so as to substantially oxidize sulphurous compounds in the gas, continuously regenerating the solution by treating the solution with an oxidizing agent so as to reduce the sulphur in the solution to cause it to precipitate for collection and for returning the solution to the tower for additional reactions.

The tower may be comprised of a plurality of raschies or saddles mounted at predetermined vertical levels on trays. Degassing means may be provided for removing entrained gases in the solution upon removal of the solution to the treating means, and upon recycling of the solution by the recycling means. The collector tank may be comprised of at least two sections partially separated by partitions, comprising a used solution section and a recycled solution section. The recycling means and the degassing means may be comprised of a colloid mill.

The method of the apparatus may utilize sulphur removal means which are a filter, or a drain valve. The oxidizing agent may be comprised of ozone or oxygen. The solution may be comprised of $Fe_2O_3$ suspended in water.

DESCRIPTION OF THE PREFERRED EMBODIMENT

Figure 1:
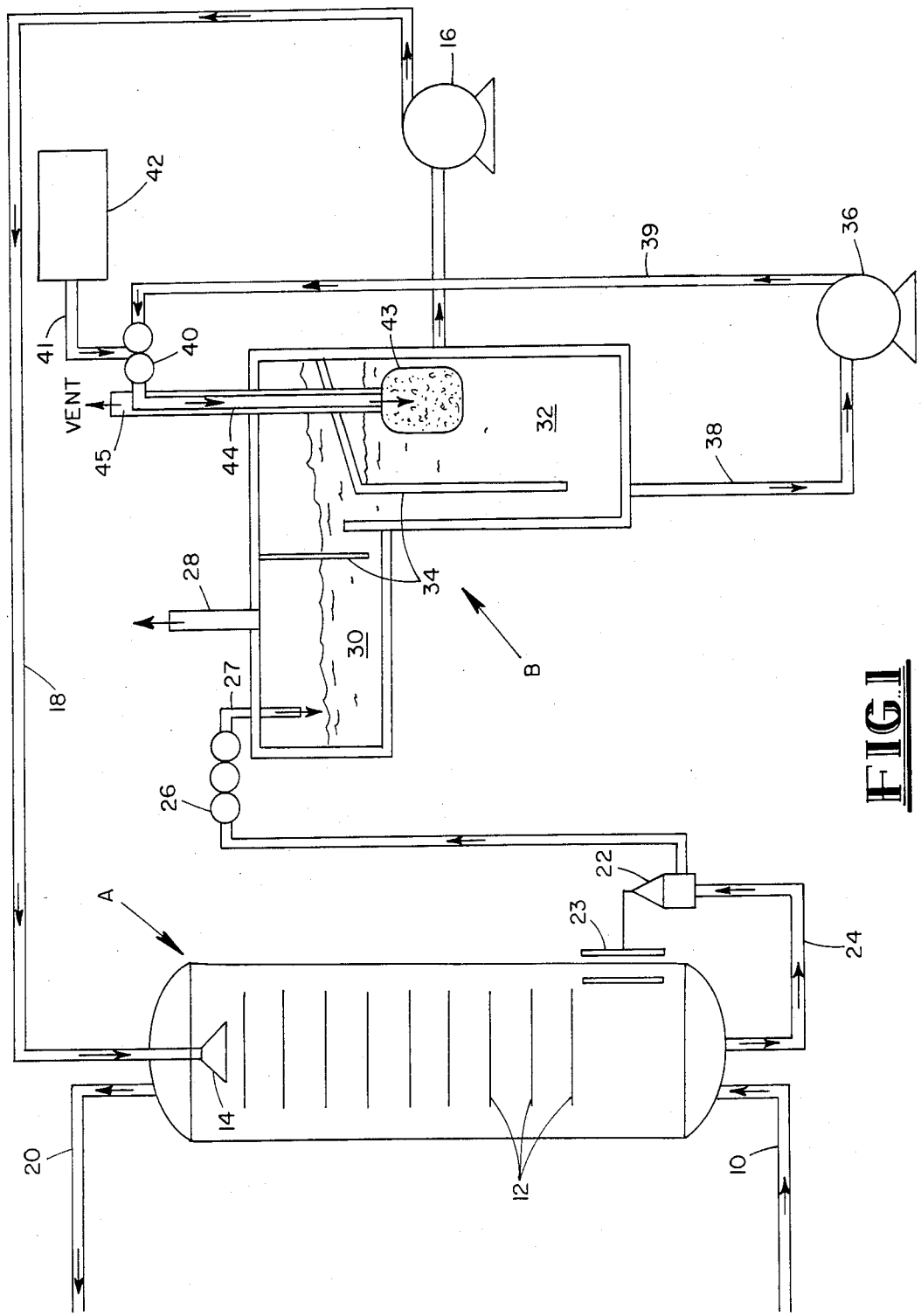
FIG. 1 is a diagram of the preferred embodiment of the present invention.

Referring to FIG. 1, the diagram of the apparatus used in the process of desulphurizing natural gas is shown. The apparatus and method are able to run relatively continuously, because the $Fe_2O_3$ used to desulphurize the natural gas is constantly being recirculated and regenerated for further use. Thus, the process does not have to be shut down while the $Fe_2O_3$ is replenished or replaced. Further, the process is relatively closed, so that it can be run safely.

The sulphuric gaseous compound most commonly found in "sour" natural gas is hydrogen sulfide, $H_2S$. In the present invention, the overall reaction used for removing the $H_2S$ is:

$$6H_2S + 3O_2 \rightarrow S_6 + 6H_2O$$

or $$6H_2S + 2O_3 \rightarrow S_6 + 6H_2O$$

As the sulphur is reduced to elemental form, it may be removed.

A variety of oxides, preferably metallic oxides, can be used for breaking up the $H_2S$ gas into elemental sulphur and other neutral compounds. The preferred embodiment uses red iron oxide, $Fe_2O_3$, although other metal oxides, particularly cupric oxide, $CuO$, could be used.

Referring to FIG. 1, the apparatus consists of two major components, a contracting means, comprised primarily of tower A, and a treating means, comprised primarily of collector tank B and recycling means 40. The reaction mentioned above occurs in two major steps. The first step occurs in the tower A and consists of:

$$6H_2S + 2Fe_2O_3 \rightarrow 2Fe_2S_3 + 6H_2O$$

In the recycling means 40, the following reaction takes place:

$$2Fe_2S_3 + 2O_3 \rightarrow S_6 + 2Fe_2O_3$$

The treatment of the "sour" natural gas occurs in the tower A, and the recycling procedure of the compounds occurs in the collector tank B and recycling means 40.

The sour gas enters the tower A through a first conduit 10 along the bottom of the tower A. The tower A is preferred to be cylindrical in shape, for economy of fabrication. The height and diameter of the tower A will depend on the velocity volume flow of sour natural gas desired to be treated, as the gas must move through the tower A slowly enough to allow sufficient reaction time. The materials used in the tower A do not have to be corrosion resistant, because the $Fe_2O_3$ solution used in the process forms a protective coating on the interior of the tower A and other components, which prevents the sulphurous compounds from corroding the machinery.

The tower A will be filled with a plurality of trays 12 at spaced vertical intervals in the tower A. The trays 12 will hold a certain amount of raschies or saddles (not shown) which are packing materials known in the art. A saddle is an object known in the art comprised of a small stainless steel chip which has been bent to curve in one direction along a first axis and in the opposite direction along a second axis, i.e., like a saddle. Saddles are readily available and, as will be explained, are used to evenly distribute the solute mixture which will be reacted with the sour gas. Ceramic saddles and raschies are also known. The size of the saddles used depends on the velocity of the gas treated. An increased saddle size will be used for slower gas flows, because a smaller saddle is capable of being more densely packed in the trays 12, which slows down gas flow. A raschie performs a similar function, except that it is generally cylindrical and perforated. Raschies are available from manufacturers such as Cook Engineering of Wichita, Kans.

At the top of the tower A a sprayer 14 is provided for receiving solution from the collector tank B and spraying it down into the tower A onto the trays 12. The solution in the preferred embodiment is comprised of red iron oxide $Fe_2O_3$ suspended in water. The concentration will depend on the volume of gas treated and the concentration of $H_2S$ in the gas. This solution is removed from the collector tank B by a pump 16 and pumped through sprayer conduit 18 to the sprayer 14. As the solution is being sprayed onto the trays 12, the sour natural gas is being bubbled up through the tower A, so that the reaction described above takes place. The raschies or saddles are tightly packed in the trays 12, so that the solution will be spread by the raschies or saddles to provide a large surface area for contact with the natural gas. The desulphurized natural gas is removed from the tower A and carried to a pipeline for transmission by second conduit 20. The $Fe_2S_3$ and water formed by the desulphurization of the natural gas collects in the bottom of the tower A. When these liquids reach a predetermined level, removal means 22 senses that the liquids have reached the predetermined level and opens a valve (not shown) on the bottom of tower A so that the liquids can be carried back to the collector tank B by a third conduit 24. In the preferred embodiment, the removal means 22 is an electric liquid level control valve such as is known in the art, which has a magnetic sensing means 23 for controlling the valve. Pressures within the tower A will be relatively high, with an average tower A operating at about 400 to 100 psi. Thus, the preferred embodiment does not have a need for a pump to return the solution to the collector tank B.

Besides $Fe_2S_3$ and water, the solution carried back to the collector tank B may contain unreacted red iron oxide as well as entrained gases. Some of these gases may be unreacted $H_2S$ or other corrosive or toxic gases found in natural gas, and it is desired to remove these gases before the recycling process occurs.

This is accomplished by a degassing means 26. The degassing means 26 used in the present embodiment is a molecular agglomerate reducer, or "colloid mill". One type of colloid mill is described in U.S. Pat. No. 4,261,521, issued to one of the co-inventors of the present application, and incorporated herein by reference in tot, for all purposes. In U.S. pending application, Ser. No. 726,429, now U.S. Pat. No. 4,645,606 which is incorporated herein by reference in toto, for all purposes, and of which this application forms a continuation-in-part, a design for a second and third type of colloid mill in the treatment of water and sewage is described.

Figure 3:
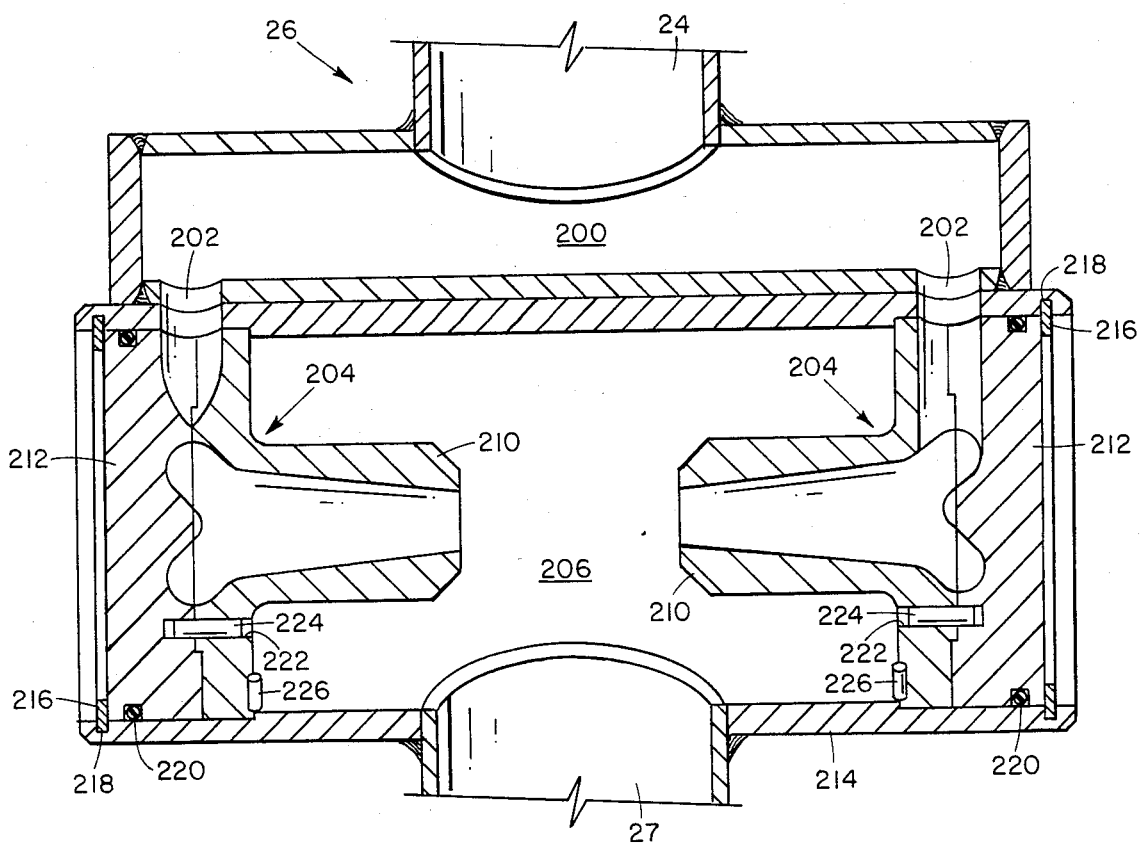
FIG. 3 is a cross sectional view of the degassing means, as viewed from lines 3—3 of FIG. 1.

In FIG. 3 is shown a cross sectional view of the degassing means 26, which is similar in design to the colloid mill disclosed in the pending application for treating water. As the solution is received by the degassing means 26 from the conduit 24, it enters a collection chamber 200 where it is collected and split into two streams by entering the vortex entrances 202. As can be seen in FIG. 3, and as described more fully in the pending application and in U.S. Pat. No. 4,261,521, the solution is accelerated through the vortex nozzles 204 in opposite circular motions. In FIG. 3, if looking at the degassing means 26 from the left side, it can be seen that the solution enters the vortex entrance 202 on the left side and begins to rotate in the vortex 203 in a counterclockwise direction. Taking the same view, the solution is rotated in the right vortex 203 in a clockwise motion before exiting the nozzle portion 210. The solution is accelerated by the respective vortex nozzles 204 and exits the vortex nozzles 204 at a high speed where it collides with solution exiting the opposite vortex nozzle 204. The solution collects in the vortex chamber 206 and is removed by another conduit 27 to the collector tank B.

Applicants have found that the colloid mill is useful as a degassing means 26, because as the solution released from the tower A is split into two streams and sprayed together by the vortex nozzles 204, this high energy mechanical action breaks molecular bonds and creates a vacuum in the fluid, so that entrained gases can more easily escape. The entrained gases are vented through a first venting means 28.

The vortex nozzles 204 are comprised of a nozzle portion 210 which has a tapered inner passage 211 and a base portion 212 held within a hollow cylindrical vortex frame or housing 214 by a lock ring 216 behind each base portion 212, which is held in place by a lock ring slot 218. An O ring 220 seals the vortex chamber 206 from the exterior. The nozzle portion 210 and base portion 212 remain aligned relative to each other by providing aligned openings 222 secured by dowelpins 224. The nozzle portion 210 and base portion 212 are prevented from rotating within the vortex chamber 206 by a second dowelpins 226.

Collector tank B is partially divided into two sections, a used solution section 30 and a recycled solution section 32. Partition means 34 are placed within the collector tank B to partially obstruct the flow of solution in the tank B, so that the used solution does not readily mix with the recycled solution. A recycle pumping means 36 extracts used solution as it begins to pass into the recycled solution section 32. This predominantly used solution is pumped at high pressure through a fourth conduit 38 to a recycling means 40. This recycling means 40 in the present embodiment is also comprised of a colloid mill.

It is at the recycling means 40 where the second reaction mentioned above take place. The reaction may take one of two forms:

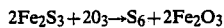

or

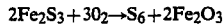

In the preferred embodiment, the reaction using ozone is the one employed.

Figure 2:
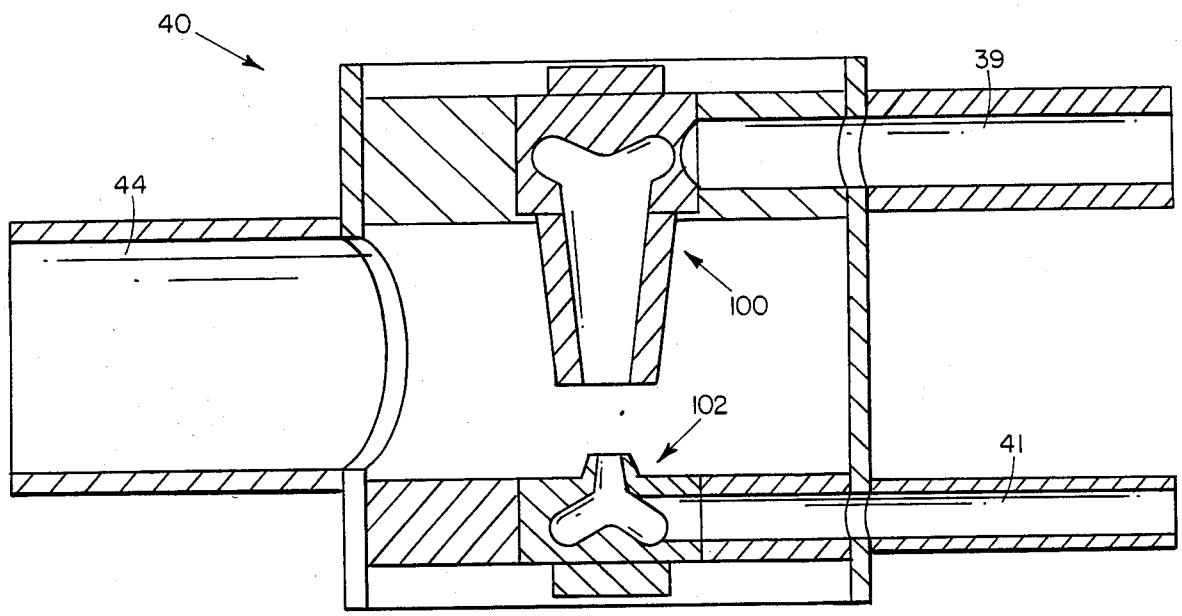
FIG. 2 is a cross sectional view of the recycling means, as viewed from lines 2—2 of FIG. 1.

The colloid mill used in the recycling means 40 will be more akin in design to that described for the treatment of sewage in U.S. pending application Ser. No. 726,429, and is shown in FIG. 2. Ozone is supplied to the recycling means 40 by an ozone generator 42, such as are manufactured by Schmidding-Werke of Wilhelm Schmidding GmbH & Co. of West Germany. Ozone is the preferred substance because of its high oxidation capability. However, the less expensive alternative of reacting the $Fe_2S_3$ with oxygen may be used, and the oxygen may be that normally found in air, so that special bottled oxygen is not required.

In the present application, that concept is used by fabricating a recycling means 40 comprised of a solution vortex nozzle 100 and an oxidizing agent vortex nozzle 102 which both have a tapered inner passage 105. The recycling means 40 will be similar in design to the colloid mill shown in FIG. 3, so that the more detailed aspects of the design, such as the dowelpins 224, etc., are not repeated. Only the two areas of major change—the supplying of fluid to the nozzles and the relative size of the nozzles—will be discussed.

Solution is supplied to the solution vortex nozzle 100 by the recycle pumping means 36 through fifth conduit 39. An oxidizing agent is supplied to the oxidizing agent vortex nozzle 102 by a sixth conduit 41. The oxidizing agent vortex nozzle 102 is similar to the solution vortex nozzle 100, except that the scale is reduced. The reasons for the difference in scale between the solution vortex nozzle 100 and oxidizing agent vortex nozzle 102 stem from the differences in flow capabilities between a liquid and a gas. Because liquid and gas are accelerated so rapidly in the respective vortex nozzles, it is necessary that the opposed nozzles, 100 and 102, balance each other in a kinetic sense. In other words, if the solution exiting solution vortex nozzle 100 contains more pressure than the ozone or oxygen gas exiting the oxidizing agent vortex nozzle 102, the liquid would overpower the exiting gas and the collision between the gas and the liquid would occur near the oxidizing agent vortex nozzle 102 exit. Thus, the recycling means 40 needs to be designed so that the pressure of the liquid and gas, when exiting the respective nozzles, are equal at the area of impact so the collision will be maintained at a point approximately half way between the two nozzles, 100 and 102. The respective fluids are supplied to the nozzles, 100 and 102, and are accelerated in opposite circular motions by the oxidizing agent vortex 103 and solution vortex 104 and sprayed against each other similar to previously described. The solution is then collected in the vortex chamber 106. A seventh conduit 44 returns the solution to the collector tank B.

After passing through the recycling means 40, the liquid solution is returned to the recycled solution section 32 of the collector tank B, with any entrained gases being released by the recycling means 40 and vented by a second venting means 45.

At the point of its return to the collector tank B, elemental sulphur $S_6$ will have formed in the solution. The elemental sulphur $S_6$, because of its crystalline structure, forms in relatively large particles which are heavier than the $Fe_2O_3$ suspended in the solution. In the preferred embodiment, a filtering means 43 will be placed as the solution returns to the recycled solution section 32. The filtering means 43 should be of sufficient porosity to allow the $Fe_2O_3$ to pass through the filtering means 43, but retain the elemental sulphur $S_6$. However, other methods of removing the elemental sulphur $S_6$, such as merely allowing the sulphur to settle to the bottom of the collector tank B to be removed through a drain or valve, are also feasible.

While the reaction taking place in the recycling means 40 has been referred to as "oxidation", it is apparent that the sulphur is actually being reduced to $S_6$.

As can be seen from the above explanation, the process is capable of running relatively continuously and safely, because it is essentially a closed system. Further, little maintenance is required to maintain the system. The filtering means 43 will need to be emptied at some interval, and it will also be necessary to replenish the $Fe_2O_3$ in the solution as the solution wears out. However, both of these maintenance steps can be done very quickly, so that it may not even be necessary to shut down the process during the maintenance.

A representative concentration of $H_2S$ gas found in natural gas would be in the range of 500 parts per million. For a completely efficient process, this would require $1.01 \times 10^{-4}$ pounds of $Fe_2O_3$ to remove the $H_2S$ from one cubic foot of natural gas. This translates to approximately 101 pounds of $Fe_2O_3$ for every million cubic feet of natural gas, but since the process normally achieves about 25% efficiency, approximately 404 pounds of $Fe_2O_3$ per million cubic feet would be required. Of course, because of the recycling process, only a small portion of this would be required in the solution. Further, it is not necessary to attempt complete removal of $H_2S$. A concentration of 0.25 grains of $H_2S$ per hundred cubic feet of gas is easily obtainable by the process and is acceptable for transmission and use.

Although the invention has been described in the above preferred embodiment, a number of variations and modifications are intended to fall within the scope of the invention. The above described embodiment only teaches one of ordinary skill in the art how to make and use the present invention. Thus, any limitation to the scope of the invention is found only in the following claims, which are to be read in light of the specification, or their equivalents.

We claim:

1. A method for continuously desulphurizing natural gas and continuously regenerating a reaction solution, comprising the steps of:
    reacting natural gas in a substantially closed tower by contacting said gas with a metallic oxide solution so as to substantially oxidize the sulphurous compounds in said gas;
    degassing said reaction solution by transporting said reaction solution through a colloid mill and venting entrained gases released therefrom;
    continuously regenerating said reaction solution by treating said reaction solution with an oxidizing agent to reduce the sulphur in said reaction solution to cause it to precipitate for collection and recycling said solution to said tower for additional reactions.

2. The method as set forth in claim 1, wherein:
    said recycling step is comprised of removing said solution from a collector tank and pumping said solution through one side of a colloid mill simultaneous to said oxidizing agent being pumped through the other side of said colloid mill.

3. The method of claim 1 wherein:
    said oxidizing agent is oxygen.

4. The method of claim 1 wherein:
    said oxidizing agent is ozone.

5. An apparatus for continuously desulphurizing natural gas and regenerating a reaction solution comprising:
    a contacting means comprised of a tower and solution removal means, said contacting means for contacting natural gas with said reaction solution to substantially oxidize sulphurous compounds in said natural gas;
    a treating means comprised of a collector tank and a recycling means, said recycling means operably connected to said contacting means and said collector tank, said treating means for continuously regenerating said reaction solution, said recycling means for circulating said reaction solution through said contacting means and said treating means;
    a degassing means operably connected to said contacting means and said treating means, said degassing means for removing entrained gases from said reaction solution;
    said degassing means is comprised of a colloid mill;
    said recycling means reducing sulphurous compounds in said solution and causing sulphur to precipitate from said solution, said sulphur being removed by a removal mechanism.

6. The apparatus of claim 5 wherein:
    said recycling means is comprised of a colloid mill.

7. The apparatus of claim 5 wherein:
    said tower is comprised of packing material placed on a plurality of vertically spaced trays;
    said packing material is comprised of raschies;
    said tower having a nozzle for introducing said reaction solution into said tower and a gas inlet for introducing natural gas into said tower and contacting said natural gas with said reaction solution through said packing material.

8. The apparatus of claim 5 wherein:
    said removal mechanism is comprised of a filter.

9. The apparatus of claim 5 wherein:
    said removal mechanism is comprised of a drain valve.

10. The apparatus of claim 5 wherein:
    said collector tank is a substantially closed, hollow structure comprised of at least two sections partially separated by partitions, said sections being a used solution section receiving solution from said degassing means and a recycled solution section providing said reaction solution to said contacting means.

11. An apparatus for continuously desulphurizing natural gas and regenerating a reaction solution comprising:
    a contacting means comprised of a tower and solution removal means, said contacting means for contacting natural gas with said reaction solution to substantially oxidize sulphurous compounds in said natural gas;
    a treating means comprised of a collector tank and a recycling means, said recycling means operably connected to said contacting means and said collector tank, said treating means for continuously regenerating said reaction solution, said recycling means for circulating said reaction solution through said contacting means and said treating means;
    a degassing means operably connected to said contacting means and said treating means, said degassing means for removing entrained gases from said reaction solution;
    said recycling means is comprised of a colloid mill;
    said recycling means reducing sulphurous compounds in said solution and causing sulphur to precipitate from said solution, said sulphur being removed by a removal mechanism.

12. The apparatus of claim 11 wherein:
said degassing means is comprised of a colloid mill.
13. The apparatus of claim 11 wherein:
said tower is comprised of packing material placed on a plurality of vertically spaced trays;
said packing material is comprised of raschies;
said tower having a nozzle for introducing said reaction solution into said tower and a gas inlet for introducing natural gas into said tower and contacting said natural gas with said reaction solution through said packing material.
14. The apparatus of claim 11 wherein:
said removal mechanism is comprised of a filter.
15. The apparatus of claim 11 wherein:
said removal mechanism is comprised of a drain valve.
16. The apparatus of claim 11 wherein:
said collector tank is a substantially closed, hollow structure comprised of at least two sections partially separated by partitions, said sections being a used solution section receiving solution from said degassing means and a recycled solution section providing said reaction solution to said contacting means.

* * * * *